Oct. 2, 1928.

Re. 17,094

A. GINABAT

SURFACE CONDENSER

Original Filed May 3, 1921 3 Sheets-Sheet 1

INVENTOR
André Ginabat
BY
Pohlbert & Ledbetter
ATTORNEYS

Oct. 2, 1928.
Re. 17,094
A. GINABAT
SURFACE CONDENSER
Original Filed May 3, 1921 3 Sheets-Sheet 2
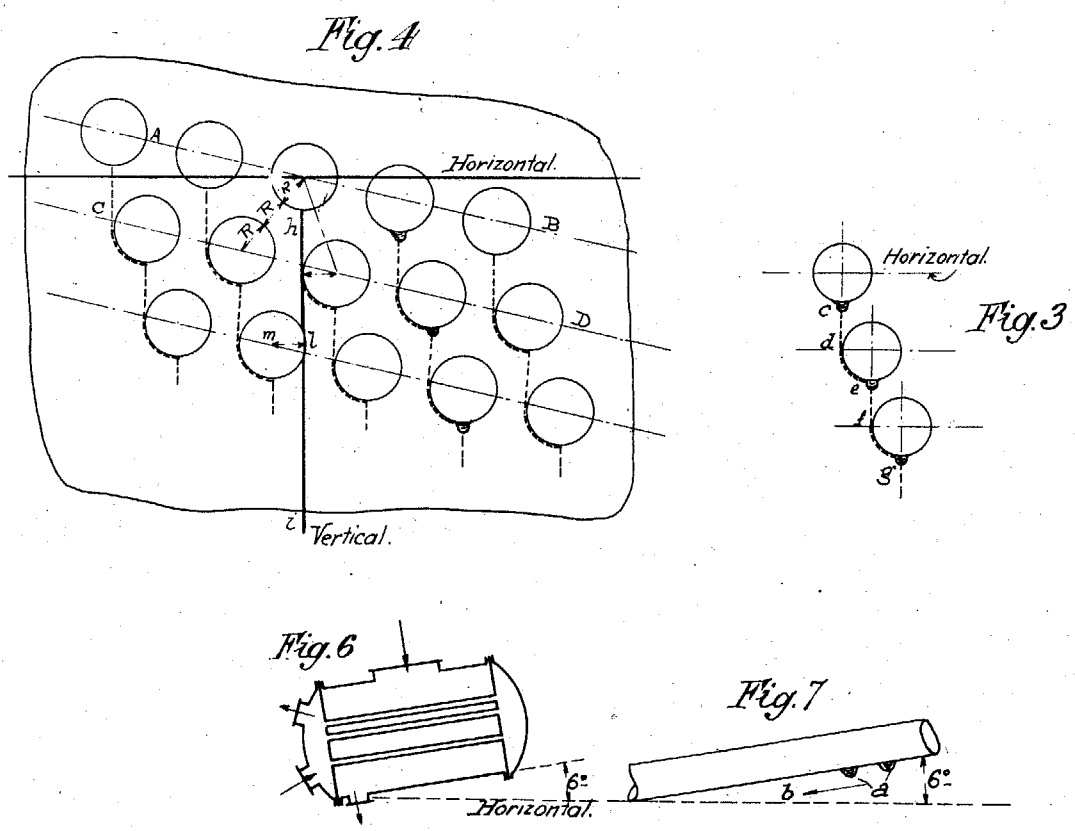
INVENTOR
André Ginabat
BY
Bohlber & Sidbetter
ATTORNEYS Oct. 2, 1928.

Re. 17,094

A. GINABAT

SURFACE CONDENSER

Original Filed May 3, 1921 3 Sheets-Sheet 3

INVENTOR
André Ginabat

BY
Bohlebert & Sedbetter
ATTORNEY

Reissued Oct. 2, 1928. Re. 17,094

UNITED STATES PATENT OFFICE.

ANDRÉ GINABAT, OF PARIS, FRANCE.

SURFACE CONDENSER.

Original No. 1,451,334, dated April 10, 1923. Serial No. 466,481, filed May 3, 1921. Application for reissue filed May 9, 1924. Serial No. 712,169.

The present invention relates to condensing apparatus of the "surface" type in which the condensation of a fluid or of a vapour produces, by transfer of heat, the elevation of temperature of another fluid separated from the first one by a metallic wall. Such are, for instance, the surface condensers of steam engines and turbines.

In these apparatus the transfer of the heat of the steam to be condensed to the circulating water takes place across the walls of numerous tubes constituting a tubular system, the phenomenon of the condensation taking place in a vessel where a vacuum is or is not maintained.

The position of the tubes in the tubular system and their relative disposition are not a matter of indifference as far as a good thermal efficiency of the apparatus is concerned. Experience shows that the indiscriminate dripping of the water due to the condensation on the upper tubes considerably diminishes the efficiency of the condensing surface of the lower tubes upon which it falls; it is known moreover that the coefficient of transfer of heat of the steam to a cold and nearly dry wall has a much higher value than when a layer of liquid, which is a bad conductor of heat, exists between the steam and the same wall.

The present invention is based on the above considerations and has for its object the production and the maintenance of a high and improved efficiency for the whole of the condensing surface of a system of tubes by aiming to secure a considerable reduction of the dripping.

Referring to the drawings filed herewith:

Fig. 3 is a similar section showing the improved arrangement of tubes according to this invention, showing the reduction of wet area.

Fig. 4 is a similar section showing one method of carrying out the invention in a tubular system.

Fig. 6 is a longitudinal section of a surface condenser with inclined tubes.

Fig. 7 is a side elevation of one of the tubes of Fig. 6, on a large scale.

The drawbacks of the dripping are considerably diminished by reducing to a minimum the extent and the duration of the contact of the liquid drops (due to the condensation of the steam at the contact of the tubes in which circulates cooling water) falling from the upper tubes, with the surface of the tubes on which they fall.

Figure 1:
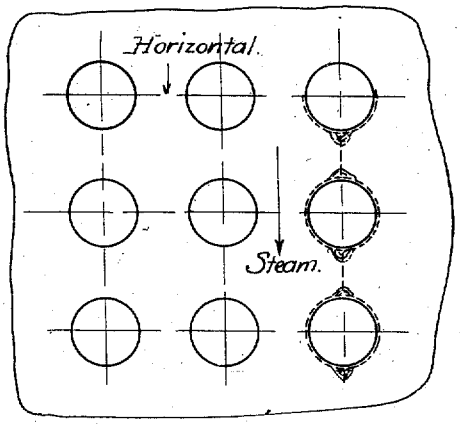
Figs. 1 and 2 are sections of the tubular system illustrating the usual arrangement of tubes in surface condensers, showing the manner in which dripping ordinarily takes place.
Figure 2:
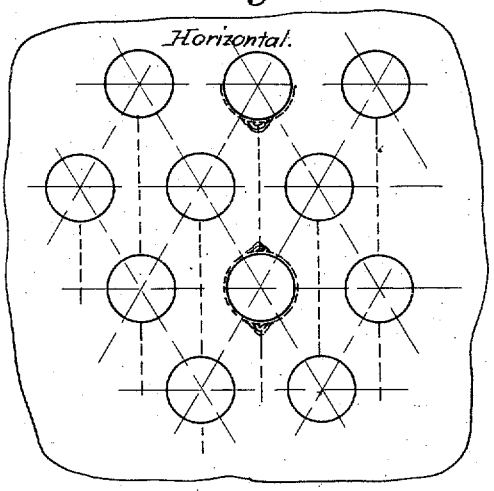

In the ordinary condensers the rows of tubes are, some horizontal, the others vertical (Fig. 1) or else the horizontal rows are arranged as shown in Fig. 2 where the axes of the tubes occupy most often the apices of an equilateral triangle.

These two arrangements are equally defective; in both cases tubes are placed two by two directly one underneath the other, so that the drops from the upper tube fall entirely on the upper generating line of the corresponding lower tube. They spread on the latter and, the whole speed of their fall being practically destroyed, they form all around it a persisting and insulating film.

The present invention obviates this drawback, and among other things, consists, broadly stated, of passing the steam to be condensed over a plurality of superimposed cooling tubes and simultaneously maintaining at least a portion of the circumferential surface of said tubes in the general direction of flow of the steam free from the insulating effect of the water of condensation flowing in the interior of the condenser. To this end the tubes of the system are so located and arranged that the water of condensation dropping from the upper tube falls on one side of the tube placed just below it. However, the ideal arrangement of the tubes, from the standpoint of performance and efficiency, is that illustrated in Figs. 3, 4 and 5; that is to say the arrangement in which a vertical line from the center of each tube is practically tangent at the end of a horizontal radius of the tube located underneath from the top to the bottom of the tubular system, and that specific arrangement will be described to illustrate the invention. It follows that the path of the drops of condensed water is represented by the line *c d e f g*, and that the surface of contact of each one with the lower tube is reduced to about a quarter of the circumference *d e*, *f g*, . . . on each tube. Moreover, the duration of these contacts is reduced to a minimum for when the drop *c*, (Fig. 3) arrives in *d*, tangentially to the lower tube, the speed of its fall is practically undiminished; it describes very rapidly the very sloping path *d e*, forms again at *e*, and falls at once on the following tube, and so on.

As this rapidity of the displacement of the water along the arcs *d e*, *f g*, has the further advantage of avoiding a useless cooling of the water of condensation, which comes out of the condenser at a higher temperature, there is a further improvement in the thermal efficiency of the apparatus.

Lastly it does not matter whether the verticals *c d*, *e f*, . . . defined above are tangent to the right or the left extremity of the horizontal diameter of each lower tube; this tube can also be another one than the one immediately underneath. The principle of the invention remains unimpaired.

As an example, Fig. 4 illustrates a portion of a tubular system constructed according to the geometrical and physical consideration just explained.

In this system, tubes of radius R are arranged in such a manner that their centers are located in groups of three on the apices of an equilateral triangle the side of which is substantially equal to 3R, in such a manner that the oblique rows A B, C D, etc. so formed are inclined about 11° to the horizontal. It follows from this arrangement that any vertical such as *h i*, passing through the center of any one tube of the upper row is practically tangent to the end *j* of the horizontal radius *j k* of the tube of the center *k* situated on its right and at the end *l* of the horizontal radius *m l* of the tube of the center *m* situated on its left. This peculiarity has the following advantage: when, owing to a disturbing puff of steam, or owing to the rolling, for instance on board ship, the drop coming from the point *h* happens to pass outside the point *j*, and miss the tube *k* it can only fall on the tube *m* in the region of point *l*, that is practically it will wet this tube only upon the lower quarter of its circumference.

On Figure 4, the dotted lines show the normal path of the liquid drops. If the rows of tubes A B, C D, etc. were inclined at the same angle of 11° to the horizontal, but on the other side of this horizontal, the course of the drops with this new arrangement would become symmetrical to the former one with respect to the vertical.

It is very advantageous to utilize in the same tubular system symmetrical courses of the drops or, which comes to the same, to utilize the symmetrical inclination of the rows of tubes on either side of the horizontal. It is known as a matter of fact that in most of the condenser tubular systems clearances are provided, that is, spaces free from tubes, with the object of directing the steam to be condensed and to distribute it through the system of tubes in the most uniformly possible manner.

Figure 5:
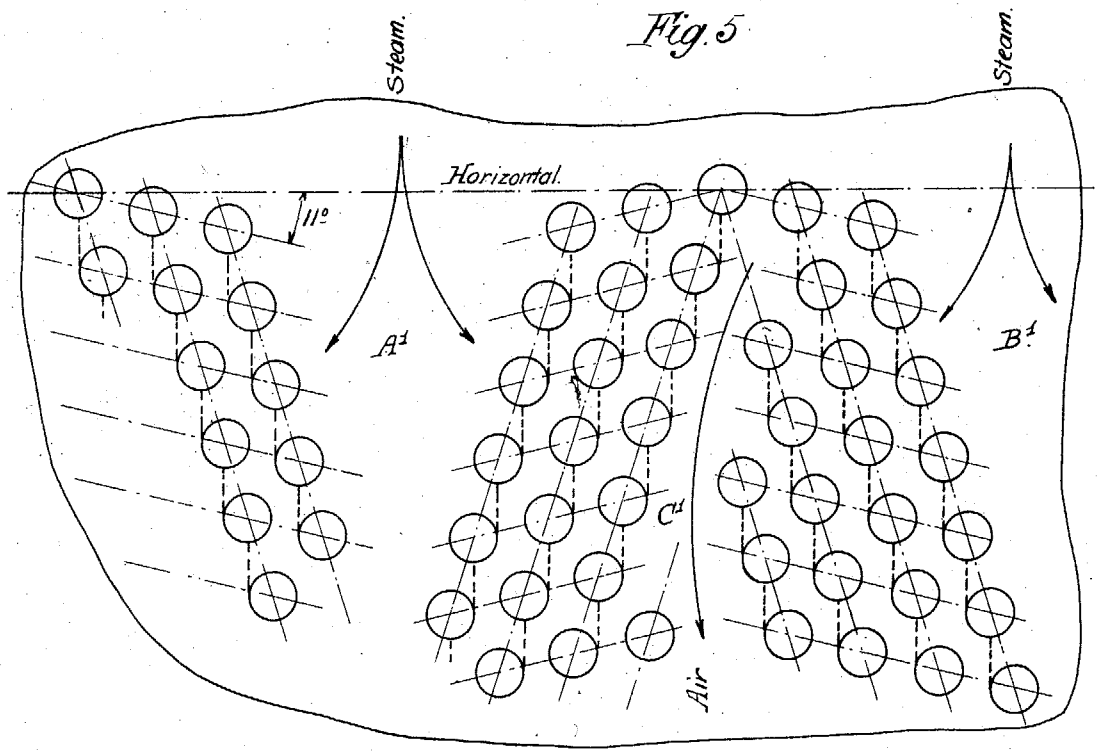
Fig. 5 is a similar section showing another method of carrying out the invention with clearances of free spaces.

Figure 5 illustrates as an example a portion of a tubular system in which this arrangement is obtained. The clearances are the spaces $A_1$ $B_1$, in which the general direction of the steam is indicated by the upper arrow. Now, it is important that the tubes should present their dryest surface normally to that direction, that is their surface most adapted to produce the condensation of the steam; in order to obtain this result it is sufficient to arrange the inclination of the rows of tubes as shown on Fig. 5 where it is seen that the wet portion of each of them is in the opposite direction to the flow of steam arriving upon it.

Finally in the group of tubes situated between two consecutive clearances $A_1$ $B_1$, it is possible to provide at the middle a space $C_1$ free from tubes where the air accumulates, and gradually falls towards the outlet to the air pump.

Figure 7 shows on a larger scale one tube of the tubular system of Fig. 6, showing that the water drops *a* formed upon this tube gather along the lower surface, cling to the tube owing to surface tension, and flow under the action of gravity and without ceasing to cling to the tube, in the direction of the arrow *b*, until they meet the tubular plate or the nearest supporting plate.

The carrying out of the present invention has therefore for its result to increase in considerable proportion the efficiency of condensing surfaces; it is therefore of such a nature as to considerably improve the efficiency of condensing apparatus and also of heating apparatus. It follows at once that in order to obtain the same results, it will be sufficient to construct apparatus in comparably less heavy, less cumbersome and consequently less costly. It will even be possible to improve the existing apparatus which have proved to be insufficient by means of an easy and relatively inexpensive alteration, which consists only in the substitution for the tubular plates existing of new plates where the tubes will be distributed and arranged according to the principle of this invention.

I have illustrated and described herein what I have considered to be the preferred forms of the invention. It is, however, to be expressly understood that I do not limit myself to these constructions as many changes may be made in points of detail and other embodiments resorted to without deviating from the true spirit and scope of my invention as defined by the annexed claims.

What I claim and desire to secure by Letters Patent is:—

1. A surface condenser of the tubular type having tubes so disposed that a vertical line from any point on the axis of the upper tube of a pair of tubes is tangent at the end of a horizontal diameter of the lower tube of the pair.

2. In a surface condenser of the tubular type, a disposition of cylindrical tubes in which a vertical plane passing through the axis of a tube is tangent to the extremities of the horizontal diameters of two tubes situated, one on either side of the said plane, which last mentioned tubes are situated in two distinct lower rows of tubes.

3. A surface condenser of the tubular type having tubes so disposed that a vertical line from any point on the axis of the upper tube of a pair of tubes is tangent at the end of a horizontal diameter of the lower tube of the pair, clearance spaces being provided in the midst of the tubular system.

4. A surface condenser of the tubular type having tubes so disposed that a vertical line from any point on the axis of the upper tube of a pair of tubes is tangent at the end of a horizontal diameter of the lower tube of the pair, said tubes being located so that the centers of any three contiguous tubes are at the apices of an equilateral triangle the sides of which are equal to three times the radius of one tube.

5. In a surface condenser of the tubular type, a disposition of cylindrical tubes in which a vertical plane passing through the axis of a tube is tangent to the extremities of the horizontal diameters of two tubes situated, one on either side of the said plane, which last mentioned tubes are situated in two distinct lower rows of tubes, the said tubes being located so that the centres of any three contiguous tubes are at the apices of an equilateral triangle the sides of which are equal to three times the radius of one tube, and the rows of tubes being inclined at an angle of about 11° to the horizontal.

6. In a surface condenser of the tubular type, a disposition of cylindrical tubes in which a vertical plane passing through the axis of a tube is tangent to the extremities of the horizontal diameters of two tubes situated, one on either side of the said plane, which last mentioned tubes are situated in two distinct lower rows of tubes, the said tubes being located so that the centers of any three contiguous tubes are at the apices of an equilateral triangle the sides of which are equal to three times the radius of one tube, and the rows of tubes being inclined at an angle of about 11° to the horizontal, to the left and to the right symmetrically.

7. A surface condenser of the tubular type having tubes so disposed that a vertical line from any point on the axis of the upper tube of a pair of tubes is tangent to the extremity of a horizontal diameter of the underneath tube of the pair, the tubes being arranged in groups, each group comprising two nests of tubes arranged so that the wet portions of said tubes of one nest face the wet portions of the other, clearance spaces being provided between the groups for the entrance of steam, said tubes being arranged in such a manner that all the tubes of the condenser have their dry faces turned towards the nearest one of said clearance spaces.

8. A surface condenser of the tubular type having tubes so disposed that a vertical line from any point on the axis of the upper tube of a pair of tubes is tangent to the extremity of a horizontal diameter of the underneath tube of the pair, said tubes being located so that the centers of any three contiguous tubes are at the apices of an equilateral triangle, the sides of which are equal to three times the radius of one tube, the tubes being arranged in groups, each group comprising two nests of tubes in which the rows of tubes are inclined to the horizontal at an angle of approximately 11°, to the left and to the right respectively, clearance spaces being provided between the groups for the entrance of steam, said tubes being arranged in such a manner that all the tubes of each of said nests have their dry faces turned towards the adjacent clearance space.

9. In a surface condenser of the tubular type, a disposition of cylindrical cooling tubes at different levels, the axes of the tubes being substantially parallel in which a vertical plane parallel to the axes of the tubes and passing through the axis of a tube touches practically tangentially two other tubes, one on either side of said plane, at points located between vertical planes parallel to the axes of the tubes and passing through the axes of said two tubes.

10. In a surface condenser of the tubular type, a disposition of cylindrical condensing tubes at different levels, the axes of the tubes being substantially parallel in which a vertical plane parallel to the axes of the tubes and passing through the axis of a tube touches practically tangentially two other tubes, one on either side of said plane, at points located at one side of vertical planes passing through the axes of said two tubes, which last mentioned tubes are situated in two distinct lower rows of tubes, the tubes being located so that the centers of any three contiguous tubes are substantially at the apices of an equilateral triangle the sides of which are equal to substantially three times the radius of one tube, and the rows of tubes being inclined at an angle of about 11° to the horizontal.

11. In a surface condenser of the tubular type, a disposition of cylindrical condensing tubes at different levels the axes of the tubes being substantially parallel in which a vertical plane parallel to the axes of the tubes and passing through the axis of a tube touches practically tangentially two other tubes, one on either side of said plane, at points located at one side of vertical planes passing through the axes of said two tubes, which last mentioned tubes are situated in two distinct lower rows of tubes, the tubes being located so that the centers of any three contiguous tubes are substantially at the apices of an equilateral triangle the sides of which are substantially equal to three times the radius of one tube, and the rows of tubes being inclined at an angle of about 11° to the horizontal, to the left and to the right symmetrically.

12. A condenser comprising a plurality of cooling tubes separated by clearances for the flow of steam and residual air into a plurality of groups, each of said groups being composed of a plurality of oblique rows inclined to the vertical with the successive tubes of each row from the top to the bottom thereof located above but slightly offset from the tube just beneath it whereby the condensed water from the bottom of one tube of the row will fall on one side of the tube just beneath it and thereby cause an oblique progression into one of said clearances of the water condensed by each of said rows of tubes.

13. A condenser comprising a plurality of cooling tubes separated by clearances for the flow of steam and residual air into a plurality of groups, each of said groups being composed of a plurality of oblique rows of tubes inclined downwardly toward said clearances for steam and downwardly away from said clearances for the flow of residual air, the successive tubes of each row from the top to the bottom thereof being located above but slightly offset from the tube just beneath it whereby the condensed water from the bottom of one tube will fall on one side of the tube just beneath it and thereby cause an oblique progression into said steam clearances and away from said air clearances of the water condensed by each of said oblique rows of tubes.

14. A condenser comprising a plurality of cooling tubes separated by clearances for the circulation of steam into a plurality of groups, each of said groups being composed of a plurality of oblique rows of tubes inclined downwardly toward said clearances, the successive tubes of each row from the top to the bottom thereof being located above but slightly offset from the tube just beneath it whereby the condensed water from the bottom of one tube will fall on one side of the tube just beneath it and thereby effect an oblique progression into such clearances of water condensed by each of said oblique rows of tubes.

15. A surface condenser of the tubular type having tubes so disposed that a vertical line from every point on the axis of the upper tube of a pair of tubes is practically tangent to the lower tube of the pair, clearance spaces being provided in the midst of the tubular system for the entrance of steam.

16. A surface condenser of the tubular type having tubes so disposed that a vertical line from any point on the axis of the upper tube of a pair of tubes is practically tangent to the extremity of a horizontal diameter of the underneath tube of the pair, the tubes being arranged in groups, each group comprising two nests of tubes arranged so that the wet portions of said tubes of one nest face the wet portions of the other, clearance spaces being provided between the groups for the entrance of steam, said tubes being arranged in such a manner that all the tubes of the condenser have their dry faces turned towards the nearest one of said clearance spaces.

17. In a surface condenser of the tubular type, a disposition of cylindrical cooling tubes at different levels, the axes of the tubes being substantially parallel, in which a vertical plane parallel to the axes of the tubes and passing through the axis of a tube touches practically tangentially two other tubes, one on either side of said plane, at points located between vertical planes parallel to the axes of the tubes and passing through the axes of said two tubes, clearance spaces being provided in the midst of the tubular system.

18. In a surface condenser of the tubular type, a disposition of cylindrical cooling tubes at different levels, the axes of the tubes being substantially parallel in which a vertical plane parallel to the axes of the tubes and passing through the axis of a tube touches practically tangentially two other tubes, one on either side of said plane, at points located between vertical planes parallel to the axes of the tubes and passing through the axes of said two tubes, the tubes being arranged in groups, each group comprising two nests of tubes arranged so that the wet portions of said tubes of one nest face the wet portions of the other, clearance spaces being provided between the groups for the entrance of steam, said tubes being arranged in such a manner that all the tubes of the condenser have their dry faces turned towards the nearest one of said clearance spaces.

19. A condenser comprising a plurality of cooling tubes separated by clearances for the flow of steam and residual air into a plurality of groups, each of said groups being composed of a plurality of oblique rows inclined to the vertical with the successive tubes of each row from the top to the bottom thereof located above but slightly offset from the tube just beneath it whereby the condensed water from the bottom of one tube of the row will fall on one side of the tube just beneath it and thereby cause an oblique progression into one of said clearances of the water condensed by each of said rows of tubes whereby a major portion of the circumferential surface of said tubes in the direction of the incoming steam is maintained substantially free from the insulating effect of the water of condensation.

In testimony whereof I have signed this specification.

ANDRÉ GINABAT.